(12) United States Patent
Murata et al.

(10) Patent No.: US 9,033,524 B2
(45) Date of Patent: May 19, 2015

(54) TOUCH PANEL

(75) Inventors: Keishiro Murata, Kyoto (JP); Yousuke Chikahisa, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 469 days.

(21) Appl. No.: 13/524,470

(22) Filed: Jun. 15, 2012

(65) Prior Publication Data

US 2013/0003182 A1    Jan. 3, 2013

(30) Foreign Application Priority Data

Jun. 29, 2011    (JP) ................ 2011-144034

(51) Int. Cl.
*G02B 27/00* (2006.01)
*G06F 3/0488* (2013.01)
*G06F 3/044* (2006.01)

(52) U.S. Cl.
CPC .............. *G06F 3/0488* (2013.01); *G06F 3/044* (2013.01)

(58) Field of Classification Search
None
See application file for complete search history.

(56) References Cited

U.S. PATENT DOCUMENTS

| | | | |
|---|---|---|---|
| 2009/0091549 A1 | 4/2009 | Matsumoto et al. | |
| 2010/0003502 A1 | 1/2010 | Nashiki et al. | |
| 2010/0013798 A1 | 1/2010 | Nakajima et al. | |
| 2010/0013799 A1 | 1/2010 | Kim et al. | |
| 2011/0141059 A1* | 6/2011 | Nashiki et al. | 345/174 |
| 2011/0217548 A1 | 9/2011 | Nashiki et al. | |

FOREIGN PATENT DOCUMENTS

| | | |
|---|---|---|
| CN | 101452351 A | 6/2009 |
| CN | 101490768 A | 7/2009 |
| CN | 101498972 A | 8/2009 |
| JP | 2000-305715 | 11/2000 |
| JP | 2002-268569 | 9/2002 |
| JP | 2002-307594 | 10/2002 |
| JP | 2010-020682 | 1/2010 |
| JP | 2010-027052 | 2/2010 |
| JP | 2010-208169 | 9/2010 |

OTHER PUBLICATIONS

People's Republic of China First Office Action and Search Report for Application No. 201210225311.9 dated Nov. 26, 2014.

* cited by examiner

*Primary Examiner* — Derek S Chapel
(74) *Attorney, Agent, or Firm* — RatnerPrestia

(57) ABSTRACT

A touch panel includes a first substrate, a first reflection conversion layer formed on the first substrate, multiple belt-like first conductive layers formed on the first reflection conversion layer, and a first adhesive layer formed on the first conductive layers. The touch panel further includes a second substrate formed on the first adhesive layer, a second reflection conversion layer formed on the second substrate, multiple belt-like second conductive layers formed on the second reflection conversion layer in a direction perpendicular to the first conductive layers, a second adhesive layer formed on the second conductive layers, and a cover sheet disposed on the second adhesive layer. Pigment is dispersed in at least one of the first adhesive layer and the second adhesive layer.

13 Claims, 5 Drawing Sheets

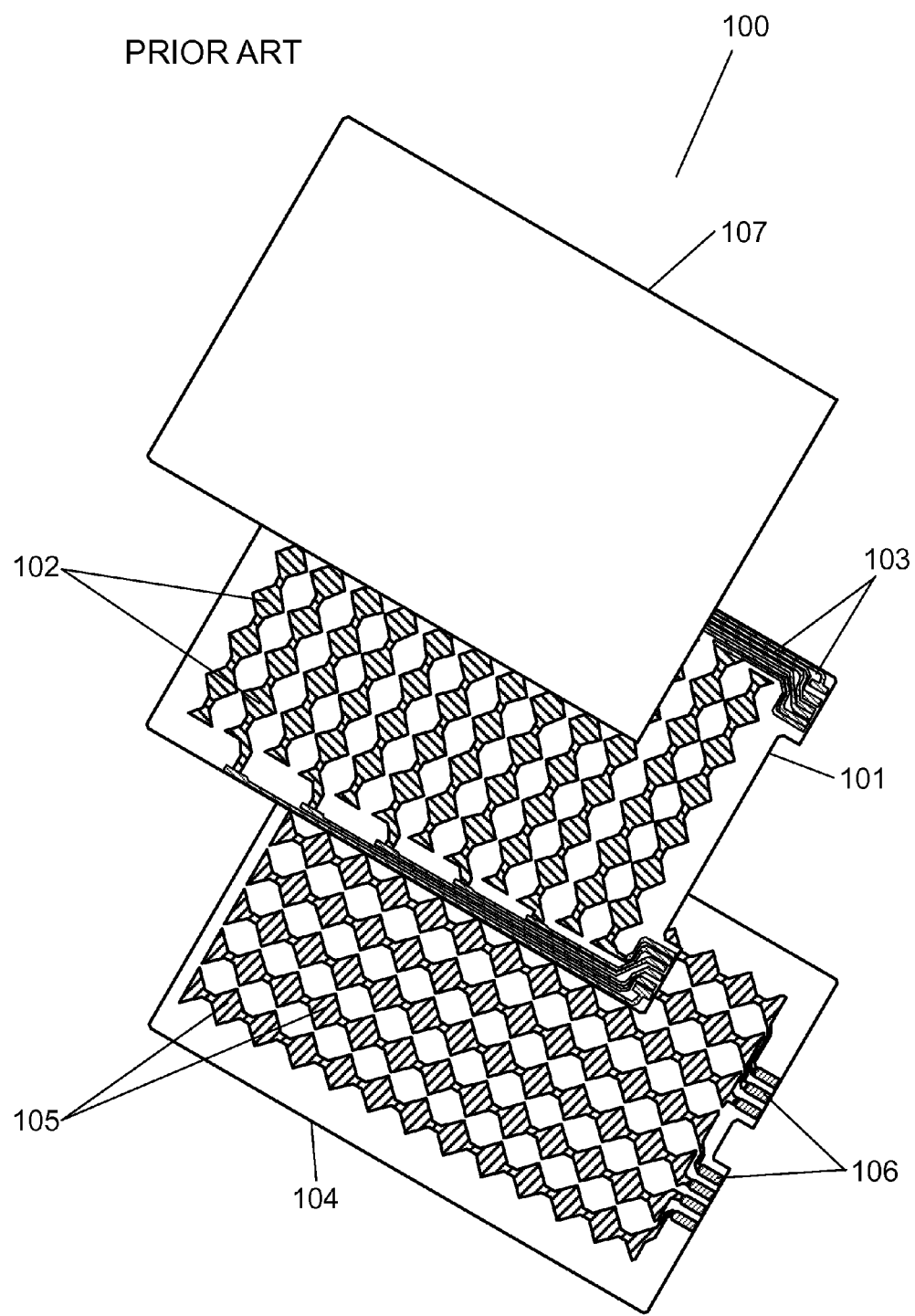

TOUCH PANEL

BACKGROUND OF THE INVENTION

1. Field of the Invention

The present invention relates to touch panels used for operating a range of electronic devices.

2. Background Art

In recent years, a range of electronic devices, including mobile phones and electronic cameras, are becoming more sophisticated and diversified. Electronic devices, in which a light-transmissive touch panel is attached to a front face of a display element such as liquid crystal, have been developed. Diversifying functions of an electronic device is switched over as the user operates a touch panel typically by finger while looking at indication of display element via the touch panel. Therefore, the user demands electronic devices that can be easily and reliably operated. FIG. 5 is a sectional view of conventional touch panel 100. FIG. 6 is an exploded perspective view of conventional touch panel 100. To facilitate understanding of structures in these drawings, dimensions are partially enlarged.

Multiple belt-like light-transmissive upper conductive layers 102 are aligned on a top face of film-like light-transmissive top substrate 101. Upper conductive layers 102 are formed of material such as indium tin oxide. One end of each of multiple upper electrodes 103 is connected to an end of each of upper conductive layers 102. The other end of each of upper electrodes 103 is led out to one peripheral end of top substrate 101. Upper electrodes 103 are typically formed of copper or silver, and are led out in a direction perpendicular to the stretching direction of upper conductive layers 102.

Multiple belt-like light-transmissive lower conductive layers 105 are aligned on a top face of film-like light-transmissive bottom substrate 104 in a direction perpendicular to the stretching direction of upper conductive layers 102. Lower conductive layers 105 are typically formed of indium tin oxide. One end of each of multiple lower electrodes 106 is connected to an end of each of lower conductive layers 105. The other end of each of lower electrodes 106 is led out to one peripheral end of bottom substrate 104. Lower electrodes 106 are typically formed of copper or silver.

Top substrate 101 is overlaid on the top face of bottom substrate 104, and film-like light-transmissive cover sheet 107 is overlaid on the top face of top substrate 101. Cover sheet 107 and top substrate 101 are attached by adhesive layer 108A, and top substrate 101 and bottom substrate 104 are attached by adhesive layer 108B. This configures touch panel 100. Adhesive layers 108A and 108B are typically formed of acryl or rubber.

Touch panel 100 configured in this way is disposed on a front face of display element (not illustrated), such as liquid crystal, and mounted on an electronic device (not illustrated). Multiple upper electrodes 103 and lower electrodes 106 led out to one peripheral end are electrically connected to an electronic circuit (not illustrated) of the electronic device typically via a flexible wiring board and connector (not illustrated).

In the state that voltage is applied from the electronic circuit to upper electrodes 103 and lower electrodes 106, the user operates the electronic device by touching the top face of cover sheet 107 typically by finger, depending on indication of display element on the rear face of touch panel 100. The electronic circuit detects a point of operation by the change in static capacitance between upper conductive layers 102 and lower conductive layers 105 at a point where the user has operated, and switches diversifying functions of the electronic device.

For example, in the state that multiple menus are displayed by the display element on the rear face, the user touches the top face of cover sheet 107, typically by finger, to select a desired menu. This operation makes a part of potential move to the finger, and changes capacitance between upper conductive layers 102 and lower conductive layers 105 at a point where touch panel 100 has been operated. The electronic circuit detects this change, and thus the desired menu is selected.

SUMMARY OF THE INVENTION

A touch panel of the present invention includes a first substrate, a first reflection conversion layer formed on the first substrate, multiple belt-like first conductive layers formed on the first reflection conversion layer, and a first adhesive layer disposed on the first conductive layers. The touch panel further includes a second substrate formed on the first adhesive layer, a second reflection conversion layer formed on the second substrate, multiple belt-like second conductive layers formed on the second reflection conversion layer in a direction perpendicular to the first conductive layers, a second adhesive layer formed on the second conductive layers, and a cover sheet disposed on the second adhesive layer. Pigment is dispersed in at least one of the first adhesive layer and the second adhesive layer.

BRIEF DESCRIPTION OF THE DRAWINGS

FIG. 6 is an exploded perspective view of the conventional touch panel.

DETAILED DESCRIPTION OF THE INVENTION

Figure 5:
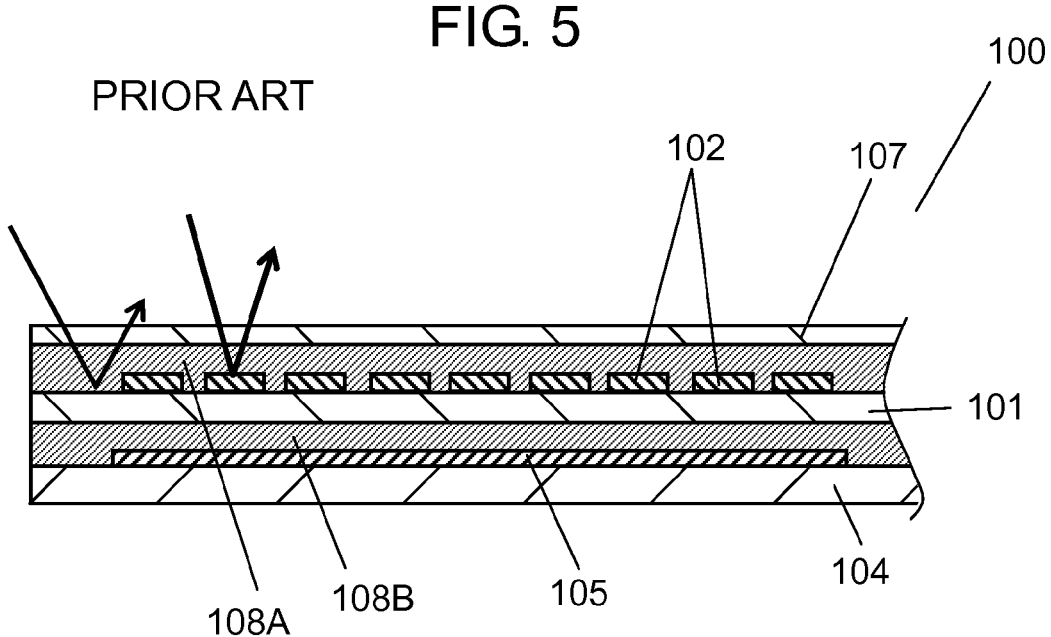
FIG. 5 is a sectional view of a conventional touch panel.

As shown in FIGS. 5 and 6, upper electrode layers 102 and adhesive layer 108A are formed on the top face of top substrate 101, and lower conductive layers 105 and adhesive layer 108B are formed on the top face of bottom substrate 104 in conventional touch panel 100. For example, a refractive index of top substrate 101 and bottom substrate 104 is between 1.4 and 1.7 inclusive, and a refractive index of adhesive layers 108A and 108B is between 1.4 and 1.5 inclusive, while a refractive index of upper conductive layers 102 and lower conductive layers 105 is approximately 2. Because of this difference in refractive indexes, a light reflected on the top face of top substrate 101 and a light reflected on the top face of upper conductive layers 102 differ, for example, if an external light, such as sunlight or electric light, enters from above, as shown in FIG. 5.

Therefore, the user can slightly notice contours of multiple belt-like upper conductive layers 102 or lower conductive layers 105. This may make the user hard to see indication of display element on the rear face of touch panel 100.

Exemplary embodiments are described below with reference to FIGS. 1 to 4. In the drawings, some of the dimensions are enlarged to facilitate understanding of structures.

First Exemplary Embodiment

Figure 1:
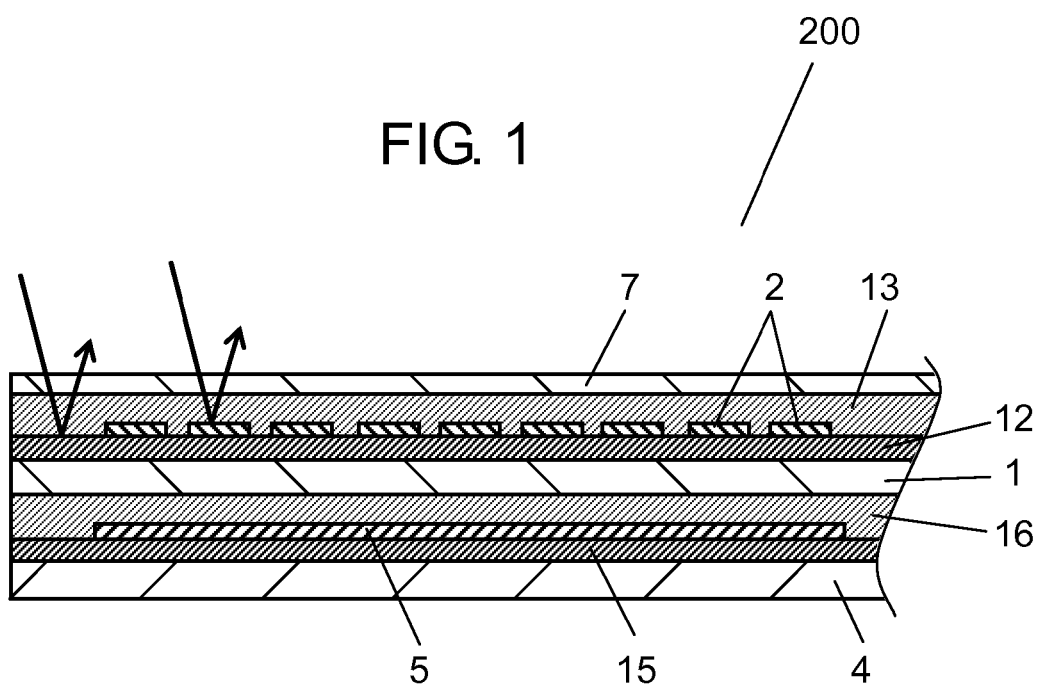
FIG. 1 is a sectional view of a touch panel in accordance with a first exemplary embodiment of the present invention.
Figure 2:
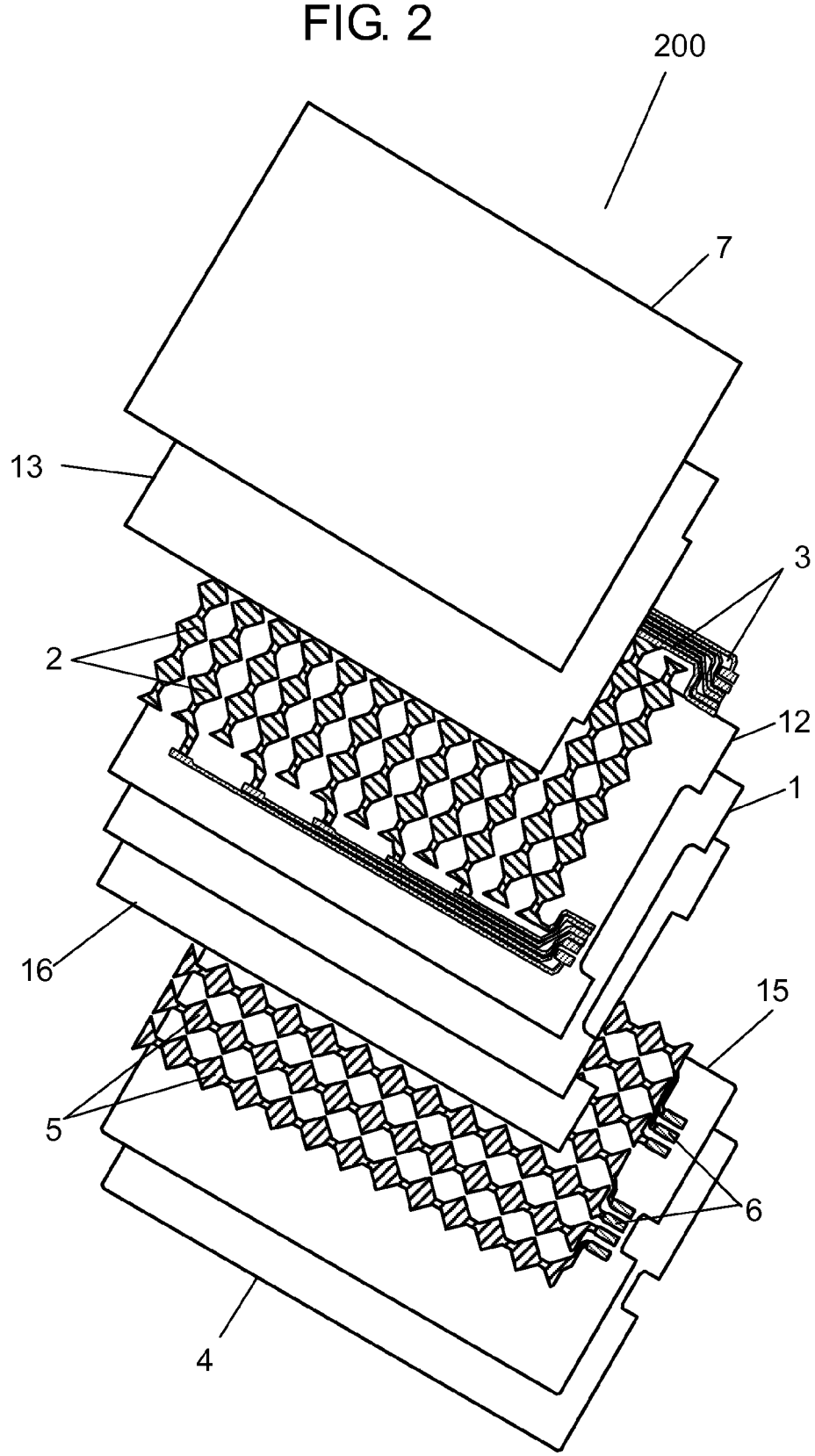
FIG. 2 is an exploded perspective view of the touch panel in accordance with the first exemplary embodiment of the present invention.

FIG. 1 is a sectional view of touch panel 200 in the first exemplary embodiment of the present invention. FIG. 2 is an exploded perspective view of touch panel 200 in the first exemplary embodiment of the present invention.

A touch panel includes a first substrate (bottom substrate 4), a first reflection conversion layer (reflection conversion layer 15) formed on the first substrate, multiple belt-like first conductive layers (lower conductive layers 5) formed on the first reflection conversion layer, and a first adhesive layer (reflection reducing adhesive layer 16) formed on the first conductive layers. The touch panel further includes a second substrate (top substrate 1) disposed on the first adhesive layer, a second reflection conversion layer (reflection conversion layer 12) formed on the second substrate, multiple belt-like second conductive layers (upper conductive layers 2) formed on the second reflection conversion layer in a direction perpendicular to the first conductive layers, a second adhesive layer (reflection reducing adhesive layer 13) disposed on the second conductive layers, and cover sheet 7 formed on the second adhesive layer. Pigment is dispersed in at least one of the first adhesive layer and the second adhesive layer.

A single or multiple light-transmissive layers of reflection conversion layer 12 are formed on the top face of film-like light-transmissive top substrate 1. Top substrate 1 is typically formed of polyethylene terephthalate, poly ethersulfone, or polycarbonate. Reflection conversion layer 12 is formed of inorganic oxide, such as silicon oxide, titanium oxide, and zirconium oxide.

Multiple belt-like light-transmissive upper conductive layers 2 are aligned on the top face of reflection conversion layer 12. Upper conductive layers 2 are typically formed of indium tin oxide or tin oxide typically by sputtering. One end of each of upper electrodes 3 is connected to an end of each of upper conductive layers 2, and the other end of each of upper electrodes 3 is led out to one peripheral end of top substrate 1. Upper electrodes 3 are led out in a direction perpendicular to the stretching direction of upper conductive layers 2. Upper electrodes 3 are typically formed of copper or silver typically by deposition.

Reflection reducing adhesive layer 13 is formed on the top face of top substrate 1 typically by printing or application. Reflection reducing adhesive layer 13 is formed by dispersing pigment, such as quinophthalone pigment, azo pigment, quinone pigment, xanthene pigment, phthalocyanine pigment, triphenylmethane pigment, polymethine pigment, azulenium pigment, squarylium pigment, and metal complex pigment; in acryl or rubber.

Reflection conversion layer 15 is provided on the top face of film-like light-transmissive bottom substrate 4. Bottom substrate 4 is typically formed of polyethylene terephthalate, polyether sulfone, or polycarbonate. Reflection conversion layer 15 is formed of inorganic oxide, such as silicon oxide, titanium oxide, and zirconium oxide. A refractive index of top substrate 1 and bottom substrate 4 is, for example, between 1.4 and 1.7 inclusive. Multiple belt-like light-transmissive lower conductive layers 5 are aligned on the top face of reflection conversion layer 15 in a direction perpendicular to the stretching direction of upper conductive layers 2. Lower conductive layers 5 are typically formed of indium tin oxide or tin oxide.

One end of each of lower electrodes 6 is connected to an end of each of lower conductive layers 5, and the other end of each of lower electrodes 6 is led out to one peripheral end of bottom substrate 4. Lower electrodes 6 are typically formed of copper or silver typically by deposition. Reflection reducing adhesive layer 16 is formed on the top face of bottom substrate 4 typically by printing or application. Reflection reducing adhesive layer 16 is formed by dispersing pigment such as quinohthalone pigment, azo pigment, quinone pigment, xanthene pigment, phthalocyanine pigment, triphenylmethane pigment, polymethine pigment, azulenium pigment, squarylium pigment, and metal complex pigment; in acryl or rubber.

Upper conductive layers 2 and lower conductive layers 5 are formed by connecting square portions into strips. Substantially square spaces are provided between these square portions. By overlaying top substrate 1 on bottom substrate 4, each square portion vertically overlaps with each space.

Top substrate 1 is overlaid on the top face of bottom substrate 4, and film-like light-transmissive cover sheet 7 is overlaid on the top face of top substrate 1. Cover sheet 7 and top substrate 1 are attached by reflection reducing adhesive layer 13. Top substrate 1 and bottom substrate 4 are attached by reflection reducing adhesive layer 16. This configures touch panel 200.

Touch panel 200 as configured above is disposed on the front face of display element (not illustrated), such as liquid crystal, and mounted on an electronic device (not illustrated). Multiple upper electrodes 3 and lower electrodes 6 led out to one peripheral end are electrically connected to an electronic circuit (not illustrated) of the electronic device typically via a flexible wiring board and connector (not illustrated).

In the state that voltage is applied from the electronic circuit to upper electrodes 3 and lower electrodes 6, the user operates the electronic device by touching the top face of cover sheet 7 typically by finger, depending on indication of display element on the rear face of touch panel 200. By the change in static capacitance between upper conductive layers 2 and lower conductive layers 5 at a portion where the user has operated, the electronic circuit detects a point that has been operated to switch to diversifying functions of the electronic device.

For example, the user touches the top face of cover sheet 7 typically by finger in order to select a desired menu in the state that multiple menus are displayed by display element on the rear face. Then, a part of potential moves to the finger, and changes a capacitance between upper conductive layers 2 and lower conductive layers 5 of touch panel 200 at a point that has been operated. The electronic circuit detects this change, and a desired menu is selected.

Reflection conversion layers 12 and 15 and reflection reducing adhesive layers 13 and 16 formed on the top faces of top substrate 1 and bottom substrate 4 reduce reflection of external light, such as sunlight and electric light, entered from above. This prevents the user from noticing contours of multiple belt-like upper conductive layers 2 and lower conductive layers 5. As a result, the user can easily see indication of display element on the rear face of touch panel 200, and thus touch panel 200 can be easily and reliably operated.

Reflection reduction adhesive layers 13 and 16, in which predetermined pigment is dispersed, absorb a predetermined light in external light, such as sunlight and electric light. Therefore, reflection of external light on the top faces of top substrate 1 and bottom substrate 4 and top faces of upper conductive layers 2 and lower conductive layers 5 is reduced.

A refractive index of reflection conversion layers 12 and 15 is between 1.4 and 2 inclusive. A refractive index of upper conductive layers 2 and lower conductive layers 5 is approximately 2. Here, the refractive index of reflection conversion layers 12 and 15 is preferably set between 1.7 and 2 inclusive so that it is close to the refractive index of upper conductive layers 2 and lower conductive layers 5. In other words, a difference between the refractive index of reflection conversion layer 12 and the refractive index of upper conductive layers 2 is preferably less than 0.3. In particular, a value subtracting the refractive index of reflection conversion layer 12 from the refractive index of upper conductive layers 2 is preferably less than 0.3. In addition, a difference between the refractive index of reflection conversion layer 15 and the refractive index of lower conductive layers 5 is preferably less than 0.3. In particular, a value subtracting the refractive index of reflection conversion layer 15 from the refractive index of lower conductive layers 5 is preferably less than 0.3. This reduces the difference in reflection of external light between the top faces of reflection conversion layers 12 and 15 and the top faces of upper conductive layers 2 and lower conductive layers 5. As a result, noticeable contours of upper conductive layers 2 and lower conductive layers 5 can be further prevented.

As described above, difference in reflected lights can be reduced by setting the refractive index of reflection conversion layers 12 and 15 close to the refractive index of upper conductive layers 2 and lower conductive layers 5. However, upper conductive layers 2, lower conductive layers 5, and reflection conversion layers 12 and 15 are generally formed of a thin film of approximately several to hundreds nm. Therefore, the reflected light tends to carry a predetermined color tone, for example, reddish reflected light. As a result, visibility of the rear face of touch panel 200 may be inhibited.

In this exemplary embodiment, however, reflection reducing adhesive layers 13 and 16 are provided to absorb reflected lights with predetermined color tone by predetermined pigment dispersed in reflection reducing adhesive layers 13 and 16. As a result, any difficulty in seeing indication of display element on the rear face of touch panel 200 can be prevented.

Pigment dispersed in reflection reducing adhesive layers 13 and 16 is selected depending on wavelengths of external light entering from above and reflected lights on the top faces of upper conductive layers 2 and lower conductive layers 5 and the top faces of reflection conversion layers 12 and 15.

To absorb blue light with wavelength around 400 nm, yellow pigment, such as quinophthalone pigment, azo pigment, quinone pigment, and metal complex pigment; is used. To absorb yellow light with wavelength around 630 to 640 nm, blue pigment, such as xanthene pigment, phthalocyanine pigment, triphenylmethane pigment, azo pigment, quinone pigment, polymethyne pigment, squarylium pigment, and metal complex pigment; is used. To absorb red light with wavelength round 710 to 750 nm, green pigment, such as phthalocyanine pigment, azulenium pigment, triphenylmethane pigment, quinone pigment, polymethine pigment, squarylium pigment, and metal complex pigment; is used. With this structure, reflection of external light can be reduced, and thus indication of display element on the rear face of touch panel 200 is easily noticeable.

Depending on reflection reducing adhesive layers 13 and 16, light transmission may reduce by approximately 5 to 20% around wavelengths of 400 nm, 630 to 640 nm, and 710 to 750 nm. However, in the entire visible light range of wavelengths from 380 to 780 nm, light transmission of approximately 85 to 90% is achieved.

In the above description, reflection reducing adhesive layers 13 and 16 are formed on the top face of both top substrate 1 and bottom substrate 4. However, the reflection reducing adhesive layer may be provided only on either substrate. For example, reflection reducing adhesive layer 13 is provided only on the top face of top substrate 1, and adhesive layer 108B without pigment may be provided on the top face of bottom substrate 4. Alternatively, reflection reducing adhesive layer 16 is provided only on the top face of bottom substrate 4, and adhesive layer 108A without pigment may be provided on the top face of top substrate 1. These structures also reduce reflection of external lights, compared to that of the conventional art.

The exemplary embodiment enables reflection reducing adhesive layers 13 and 16, in which pigment is dispersed, to absorb a predetermined light. Therefore, reflection of external lights, such as sunlight and electric light, is reduced. As a result, the user can easily see indication of display element on the rear face of touch panel 200, and thus touch panel 200 can be easily and reliably operated.

Second Exemplary Embodiment

Figure 3:
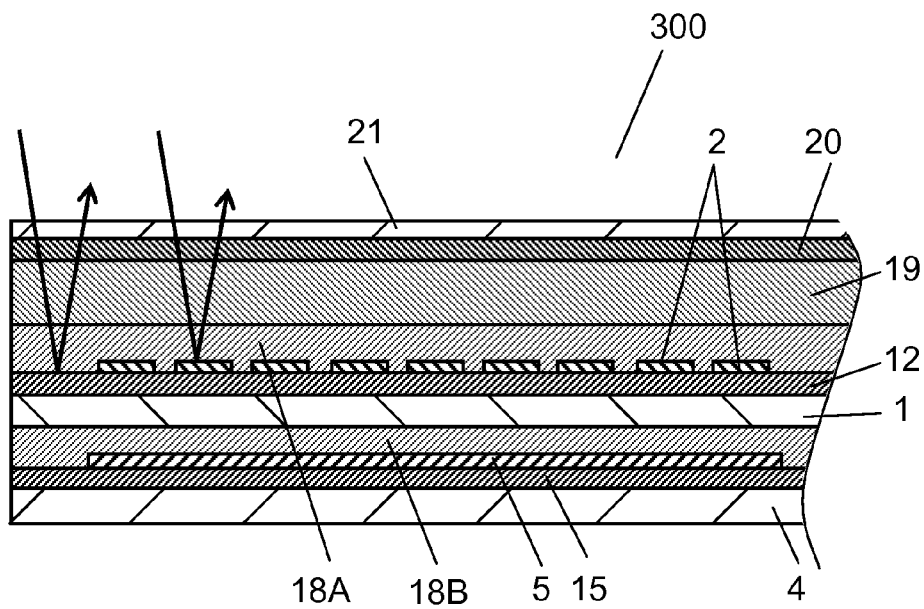
FIG. 3 is a sectional view of a touch panel in accordance with a second exemplary embodiment of the present invention.

FIG. 3 is a sectional view of touch panel 300 in the second exemplary embodiment of the present invention. Components same as that of the first exemplary embodiment are given the same reference marks to omit their detailed description.

In the first exemplary embodiment, cover sheet 7 is disposed on reflection reducing adhesive layer 13 (second adhesive layer). However, as shown in FIG. 3, light-transmissive sheet 19, reflection reducing adhesive layer 20, and cover sheet 21 may be overlaid on adhesive layer 18A. In other words, reflection reducing adhesive layer 20 (third adhesive layer) is formed on adhesive layer 18A (second adhesive layer) at a side opposite to a side of confronting upper conductive layers 2 (second conductive layer). Light-transmissive sheet 19 is disposed between adhesive layer 18A (second adhesive layer) and reflection reducing adhesive layer 20 (third adhesive layer). Furthermore, cover sheet 21 is disposed on reflection reducing adhesive layer 20 (third adhesive layer) at a side opposite to a side confronting light-transmissive sheet 19.

Adhesive layers 18A and 18B are typically formed of acryl or rubber. Film-like light-transmissive sheet 19 with optical transparency is typically formed of glass, acryl, or polycarbonate. Reflection reducing adhesive layer 20 is formed of a material same as reflection reducing adhesive layers 13 and 16. Reflection conversion layer 12 is formed on top substrate 1, and reflection conversion layer 15 is formed on bottom substrate 4. This is the same as the first exemplary embodiment.

In this exemplary embodiment, reflection reducing adhesive layer 20 (third adhesive layer) formed on the top face of light-transmissive sheet 19 reduces external light and reflected light with predetermined color tone at reflection conversion layers 12 and 15.

Reflection reducing adhesive layer 20, in which pigment is dispersed, is provided on the top face of light-transmissive sheet 19, and absorbs sunlight and external light such as electric light to reduce reflection of external light typically on the top faces of upper conductive layers 2 and lower conductive layers 5. Still more, reflection reducing adhesive layer 20 absorbs reflected light with predetermined color tone at reflection conversion layers 12 and 15. As a result, the user can easily see indication of display element on the rear face of touch panel 300, and thus touch panel 300 can be easily and reliably operated.

A difference in reflection between external light on the top faces of reflection conversion layers 12 and 15 and the top faces of upper conductive layers 2 and lower conductive layers 5 can be reduced by setting a refractive index of reflection conversion layers 12 and 15 close to a refractive index of upper conductive layers 2 and lower conductive layers 5. As a result, noticeable contours of upper conductive layers 2 and lower conductive layers 5 can be further prevented. This is the same as the first exemplary embodiment.

Pigment may be dispersed in one or both of adhesive layers 18A and 18B. In other words, one or both of adhesive layers 18A and 18B may be formed of the same material as reflection reducing adhesive layer 20.

Figure 4:
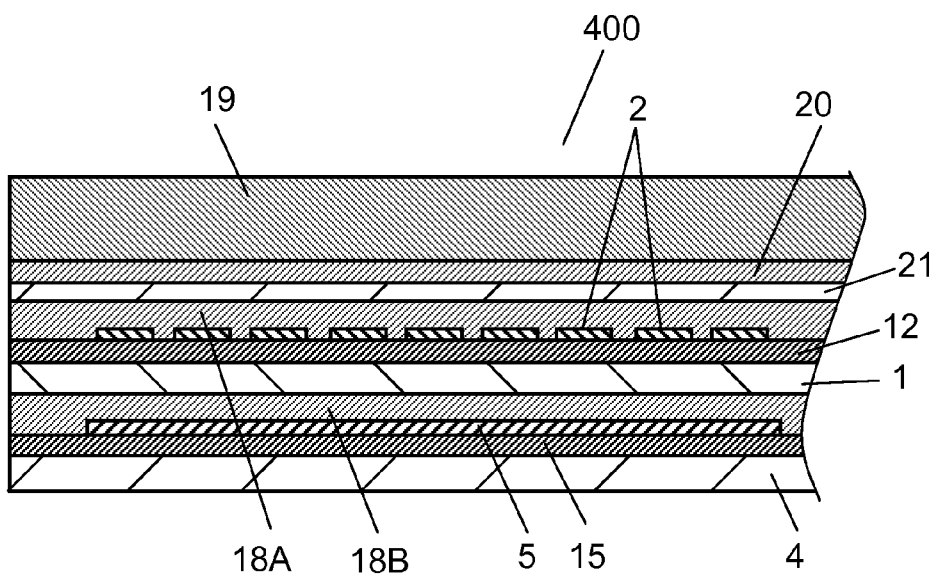
FIG. 4 is a sectional view of another touch panel in accordance with the second exemplary embodiment of the present invention.

In the above description, reflection reducing adhesive layer 20 and cover sheet 21 are disposed on the top face of light-transmissive sheet 19. However, as shown in FIG. 4, cover sheet 21, reflection reducing adhesive layer 20 (third adhesive layer), and light-transmissive sheet 19 may be overlaid on adhesive layer 18A. In other words, light-transmissive sheet 19 may be disposed on reflection reducing adhesive layer 20 (third adhesive layer) at a side opposite to a side confronting adhesive layer 18A (second adhesive layer). Furthermore, cover sheet 21 may be disposed between adhesive layer 18A (second adhesive layer) and reflection reducing adhesive layer 20 (third adhesive layer).

This structure also reduces reflection of sunlight and external light such as electric light. As a result, the user can easily see indication of display element on the rear face of touch panel 400, and thus touch panel 400 can be easily and reliably operated.

In the above description, upper electrode 3 and lower electrode 6 are typically formed of copper or silver typically by sputtering or deposition. However, upper electrode 3 and lower electrode 6 may be formed by printing silver or carbon.

The touch panel in the exemplary embodiments has an advantageous effect of achieving good visibility and reliable operation. Accordingly, the exemplary embodiments are chiefly effective for operation of a range of electronic devices.

What is claimed is:

1. A touch panel comprising:
a first substrate;
a first reflection conversion layer formed on the first substrate;
a plurality of belt-like first conductive layers formed on the first reflection conversion layer;
a first adhesive layer formed on the first conductive layers;
a second substrate disposed on the first adhesive layer
a second reflection conversion layer formed on the second substrate;
a plurality of belt-like second conductive layers which is formed on the second reflection conversion layer and perpendicular to the first conductive layers;
a second adhesive layer formed on the second conductive layers; and
a cover sheet disposed on the second adhesive layer;
wherein pigment is dispersed in at least one of the first adhesive layer and the second adhesive layer.

2. The touch panel of claim 1,
wherein a value subtracting a refractive index of the first reflection conversion layer from a refractive index of the first conductive layers is less than 0.3.

3. The touch panel of claim 1,
wherein a value subtracting a refractive index of the second reflection conversion layer from a refractive index of the second conductive layers is less than 0.3.

4. The touch panel of claim 1,
wherein the pigment is dispersed in the first adhesive layer, the pigment being at least one of quinophthalone pigment, azo pigment, quinone pigment, xanthene pigment, phthalocyanine pigment, triphenylmethane pigment, polymethine pigment, azulenium pigment, squarylium pigment, and metal complex pigment.

5. The touch panel of claim 1,
wherein the pigment is dispersed in the second adhesive layer, the pigment being at least one of quinophthalone pigment, azo pigment, quinone pigment, xanthene pigment, phthalocyanine pigment, triphenylmethane pigment, polymethine pigment, azulenium pigment, squarylium pigment, and metal complex pigment.

6. A touch panel comprising:
a first substrate;
a first reflection conversion layer formed on the first substrate;
a plurality of belt-like first conductive layers formed on the first reflection conversion layer;
a first adhesive layer formed on the first conductive layers;
a second substrate disposed on the first adhesive layer;
a second reflection conversion layer formed on the second substrate;
a plurality of belt-like second conductive layers which is formed on the second reflection conversion layer and perpendicular to the first conductive layers;
a second adhesive layer formed on the second conductive layers; and
a third adhesive layer formed on the second adhesive layer at a side opposite to a side confronting the second conductive layers;
wherein pigment is dispersed in at least one of the first adhesive layer, the second adhesive layer, and the third adhesive layer.

7. The touch panel of claim 6,
wherein a value subtracting a refractive index of the first reflection conversion layer from a refractive index of the first conductive layers is less than 0.3.

8. The touch panel of claim 6,
wherein a value subtracting a refractive index of the second reflection conversion layer from a refractive index of the second conductive layers is less than 0.3.

9. The touch panel of claim 6,
wherein the pigment is dispersed in the third adhesive layer, the pigment being at least one of quinophthalone pigment, azo pigment, quinone pigment, xanthene pigment, phthalocyanine pigment, triphenylmethane pigment, polymethine pigment, azulenium pigment, squarylium pigment, and metal complex pigment.

10. The touch panel of claim 6, further comprising:
a light-transmissive sheet disposed between the second adhesive layer and the third adhesive layer.

11. The touch panel of claim 10, further comprising:
a cover sheet disposed on the third adhesive layer at a side opposite to a side confronting the light-transmissive sheet.

12. The touch panel of claim 6, further comprising:
a light-transmissive sheet disposed on the third adhesive layer at a side opposite to a side confronting the second adhesive layer.

13. The touch panel of claim 12, further comprising:
a cover sheet disposed between the second adhesive layer and the third adhesive layer.

\* \* \* \* \*